United States Patent
Oh et al.

(10) Patent No.: US 9,095,000 B2
(45) Date of Patent: Jul. 28, 2015

(54) MACHINE TYPE COMMUNICATION GATEWAY USER EQUIPMENT AND MACHINE TYPE COMMUNICATION DATA RELAY METHOD OF THE SAME

(75) Inventors: Don Sung Oh, Daejeon (KR); Il Gyu Kim, Chungbuk (KR); Hyun Kyu Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 385 days.

(21) Appl. No.: 13/619,923

(22) Filed: Sep. 14, 2012

(65) Prior Publication Data

US 2013/0102244 A1 Apr. 25, 2013

(30) Foreign Application Priority Data

Oct. 19, 2011 (KR) .......................... 10-2011-0107189
Jun. 8, 2012 (KR) .......................... 10-2012-0061205

(51) Int. Cl.
*H04B 7/00* (2006.01)
*H04B 15/00* (2006.01)
*H04W 88/16* (2009.01)
*H04W 4/00* (2009.01)

(52) U.S. Cl.
CPC .............. *H04W 88/16* (2013.01); *H04W 4/005* (2013.01)

(58) Field of Classification Search
CPC .............................. H04W 88/04; H04W 88/10
USPC ......... 455/11.1, 68, 67.11, 422.1, 452.1, 509, 455/452.2, 454, 7, 20, 515, 434
See application file for complete search history.

(56) References Cited

U.S. PATENT DOCUMENTS

| | | | |
|---|---|---|---|
| 2012/0016942 A1* | 1/2012 | Cherian et al. ................ 709/206 |
| 2012/0164954 A1* | 6/2012 | Karampatsis et al. ..... 455/67.11 |
| 2013/0012191 A1* | 1/2013 | Charbit et al. ............. 455/422.1 |

FOREIGN PATENT DOCUMENTS

| | | |
|---|---|---|
| WO | 2011/051182 A1 | 5/2011 |
| WO | 2011/086426 A1 | 7/2011 |

* cited by examiner

*Primary Examiner* — John J Lee
(74) *Attorney, Agent, or Firm* — Nelson Mullins Riley & Scarborough LLP (57) ABSTRACT

Provided are machine type communication (MTC) gateway user equipment (MGUE) and an MTC data relay method of the same. The MGUE includes a first radio matching unit configured to process a signal having a first frequency band characteristic and provide radio access matching with a base station, a second radio matching unit configured to process a signal having a second frequency band characteristic and provide radio access matching with at least one MTC device, a radio access switching processor configured to convert data respectively output by the first radio matching unit and the second radio matching unit and provide the converted data, and a controller configured to find an identifier of at least one MTC device related to MTC control information received from the first radio matching unit and control the second radio matching unit to transmit the MTC control information to the MTC device.

17 Claims, 6 Drawing Sheets

MACHINE TYPE COMMUNICATION GATEWAY USER EQUIPMENT AND MACHINE TYPE COMMUNICATION DATA RELAY METHOD OF THE SAME

CLAIM FOR PRIORITY

This application claims priority to Korean Patent Application No. 10-2011-0107189 filed on Oct. 19, 2011 and Korean Patent Application No. 10-2012-0061205 filed on Jun. 8, 2012 in the Korean Intellectual Property Office (KIPO), the entire contents of which are hereby incorporated by reference.

BACKGROUND

1. Technical Field

Example embodiments of the present invention relate in general to machine type communication (MTC) gateway user equipment (MGUE) and an MTC data relay method of the same, and more particularly, to MGUE for performing Long Term Evolution (LTE)-based MTC and an MTC data relay method in which the MGUE is employed.

2. Related Art

With the quantum leap of technology, mobile communication systems have become able to provide high-speed data communication services in addition to voice communication services. As a next-generation mobile communication system of Third Generation Partnership Project (3GPP) universal mobile telecommunication system (UMTS) mobile communication system that is an existing mobile communication system, standardization of a 3GPP LTE mobile communication system has recently been under way. The LTE system implements high-speed packet-based communication having a maximum transmission rate of about 300 Mbps, which is higher than a currently provided data transmission rate.

Meanwhile, there is a recent trend toward providing machine-to-machine (M2M)/MTC technology, which can be used in vehicle telematics, the administration of physical distribution, smart metering systems, remote asset management systems, point of sale (POS) systems and security-related fields, through LTE systems. Compared with existing cellular phones that are being used in mobile communication systems, M2M/MTC devices have low mobility and transmit/receive low-speed data. In general, an MTC system is implemented by a plurality of MTC devices (e.g., as in the case of a metering system).

Due to these characteristics of MTC, there are too many problems for a mobile communication network, which has been standardized for relatively high-speed data and relatively high mobility of existing cellular phones, to accommodate a plurality of MTC devices.

In addition to a structure in which an MTC device (or user equipment (UE)) currently under standardization through 3GPP technical specification (TS) 22.368 is directly connected to a 3GPP network without a gateway, problems to be solved are as follows:

First, a base station should efficiently accommodate MTC UE with low power consumption and low output. If this is not possible, another method for efficiently accommodating MTC UE with low power consumption and low output should be provided. Also, implementation of an MTC device with low power consumption and low output requires a relatively narrow-band standard, and thus an LTE modem standard for a narrow band (e.g., 1.4 MHz) is needed.

In addition, MTC devices are implemented in different forms according to their application fields, and are vast in number compared with existing general UE. Thus, system complexity increases too much for an LTE network to manage all MTC devices. Furthermore, there are necessities of communication (activation/deactivation, triggering, addressing, and group management), mobility, data conversion, authentication and authorization, encryption, etc. of MTC devices.

SUMMARY

Accordingly, example embodiments of the present invention are provided to substantially obviate one or more problems due to limitations and disadvantages of the related art.

Example embodiments of the present invention provide machine type communication (MTC) gateway user equipment (UE) (MGUE) that provides a machine-to-machine (M2M) service between an MTC server and an MTC device.

Example embodiments of the present invention also provide an MTC data relay method in which MGUE is employed.

In some example embodiments, MGUE includes: a first radio matching unit configured to process a signal having a first frequency band characteristic and provide radio access matching with a base station; a second radio matching unit configured to process a signal having a second frequency band characteristic and provide radio access matching with at least one MTC device; a radio access switching processor configured to convert data respectively output by the first radio matching unit and the second radio matching unit and provide the converted data; and a controller configured to find an identifier (ID) of at least one MTC device related to MTC control information received from the first radio matching unit, and control the second radio matching unit to transmit the MTC control information to the MTC device.

The controller may control MTC devices in units of at least one virtual cell (VC), and each VC may include at least one MTC device.

The MGUE may further include a storage configured to store at least one piece of data among an ID of at least one MTC device, an authentication key, activation or deactivation-related data, and a transmission/reception triggering value of the MTC device.

The MGUE may further include an input/output unit configured to receive MTC control information that is directly input without passing through the base station, and provide the received MTC control information to the controller.

The controller may search the ID of the at least one MTC device stored in the storage to find the ID of the at least one MTC device related to the MTC control information.

The radio access switching processor may convert a signal output from the second radio matching unit into the signal having the first frequency band characteristic, and provide the converted signal to the first radio matching unit.

A bandwidth or a center frequency of the first frequency band characteristic may differ from a bandwidth or a center frequency of the second frequency band characteristic.

The MGUE may be permanently stationed at a fixed location or may have mobility.

In other example embodiments, MGUE includes: a radio matching unit configured to provide radio access matching with a base station and radio access matching with at lest one MTC device; and a controller configured to find an ID of at least one MTC device related to MTC control information received from the radio matching unit, and control the radio matching unit to transmit the MTC control information to the found at least one MTC device.

In other example embodiments, an MTC data relay method includes: receiving MTC control information for controlling at least one MTC device from a base station; finding an ID of the at least one MTC device related to the MTC control information; and performing a radio access matching process for data to be transmitted to the MTC device and transmitting the data subjected to the radio access switching process to the related at least one MTC device.

Receiving the MTC control information for controlling the at least one MTC device from the base station may include receiving the MTC control information through radio resources having a first frequency band characteristic.

Performing the radio access matching process for the data to be transmitted to the MTC device and transmitting the data subjected to the radio access switching process to the related at least one MTC device may include transmitting the data subjected to the radio access switching process to the at least one MTC device through radio resources having a second frequency band characteristic.

The MTC data relay method may further include: receiving data from the at least one MTC device; performing a radio access switching process so that the data received from the at least one MTC device has the first frequency band characteristic; and transmitting the data subjected to the radio access switching process to the base station.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS
OF THE PRESENT INVENTION

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" with another element, it can be directly connected or coupled with the other element or intervening elements may be present. In contrast, when an element is referred to as being "directly connected" or "directly coupled" with another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

The term "user equipment (UE)" used herein may be referred to as a mobile station (MS), user terminal (UT), wireless terminal, access terminal (AT), terminal, subscriber unit, subscriber station (SS), wireless device, wireless communication device, wireless transmit/receive unit (WTRU), mobile node, mobile, or other terms. Various example embodiments of UE may include a cellular phone, a smart phone having a wireless communication function, a personal digital assistant (PDA) having a wireless communication function, a wireless modem, a portable computer having a wireless communication function, a photographing apparatus such as a digital camera having a wireless communication function, a gaming apparatus having a wireless communication function, a music storing and playing appliance having a wireless communication function, an Internet home appliance capable of wireless Internet access and browsing, and also portable units or UE having a combination of such functions, but are not limited to these.

The term "base station" used herein generally denotes a fixed point communicating with UE, and may be referred to as other terms such as a Node-B, an evolved Node-B (eNB), a base transceiver system (BTS), or an access point.

Hereinafter, example embodiments of the present invention will be described in detail with reference to the appended drawings. To facilitate overall understanding of the present invention, like numbers refer to like elements throughout the drawings, and the description of the same component will not be reiterated.

Figure 1:
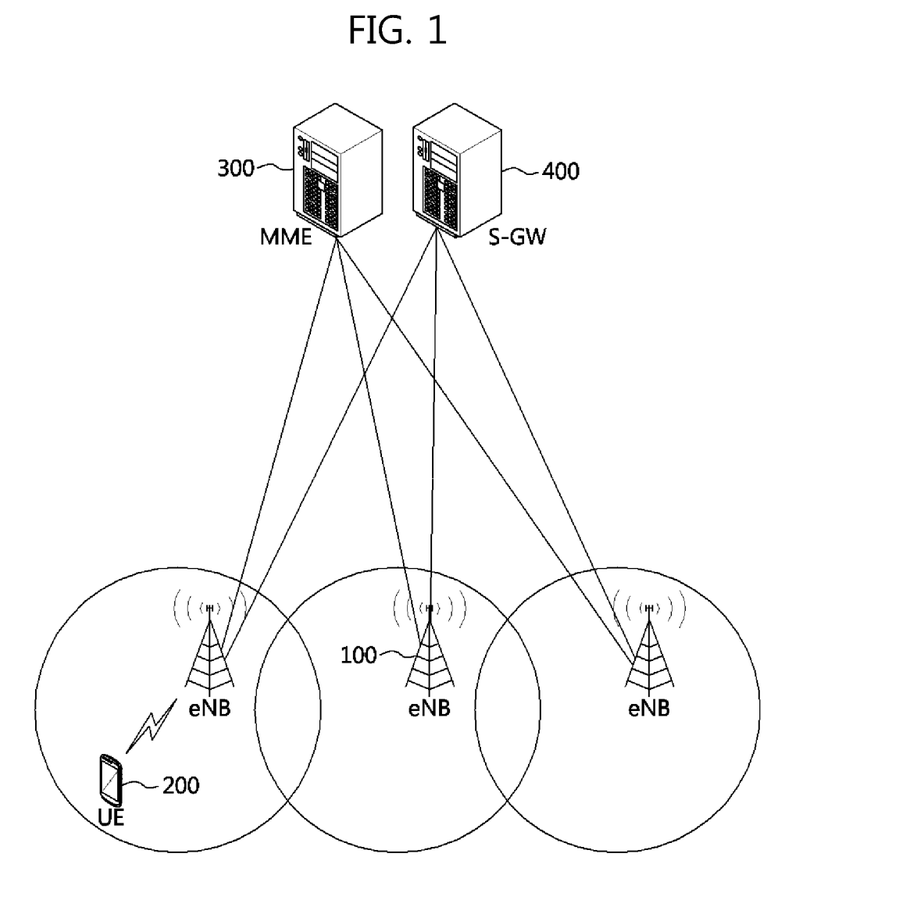
FIG. 1 is a diagram showing the constitution of a Third Generation Partnership Project (3GPP) Long Term Evolution (LTE) mobile communication system that is an example embodiment of a communication system to which the present invention is applied.

FIG. 1 is a diagram showing the constitution of a Third Generation Partnership Project (3GPP) Long Term Evolution (LTE) mobile communication system that is an example embodiment of a communication system to which the present invention is applied.

FIG. 1 shows an LTE mobile communication system as an example of a communication system to which the present invention can be applied. The LTE communication system may include at least one next-generation base station (or an eNB or a Node B) 100, a mobility management entity (MME) 300, and a serving gateway (S-GW) 400.

The MME 300 is a control plane node of the evolved packet core (EPC). As an apparatus that takes on various control functions and performs mobility management of idle-mode UE, the MME 300 is connected with at least one base station.

As a user plane node, the S-GW 400 serves to connect the EPC with an LTE radio access network (RAN). Thus, the S-GW 400 provides a data bearer, and generates or removes the data bearer under the control of the MME 300.

Meanwhile, the S-GW 400 can be present as a single entity that serves as a packet data network (PDN) gateway (PGW) and so on. Here, the PGW connects a user plane connected with the EPC to the Internet using an SGi interface.

UE 200 can access an external network through the base station 100 and the S-GW 400, and the base station 100 communicates with the UE 200 through a radio channel. In LTE, all user traffic including real-time services, such as voice over Internet protocol (VoIP) through the IP, is served through a shared channel. For this reason, there is a need for an apparatus that collects status information on UE and performs scheduling, and the base station 100 takes on this role.

Also, the base station 100 serves to control radio resources of cells. In general, one base station controls a plurality of cells. To implement a maximum transmission rate of 300 Mbps, LTE employs orthogonal frequency division multiplexing (OFDM) as a radio access technique in a maximum bandwidth of 20 MHz. Also, the base station 100 employs an adaptive modulation and coding (AMC) scheme of determining a modulation scheme and a channel coding rate according to the channel state of the UE 200.

Figure 2:
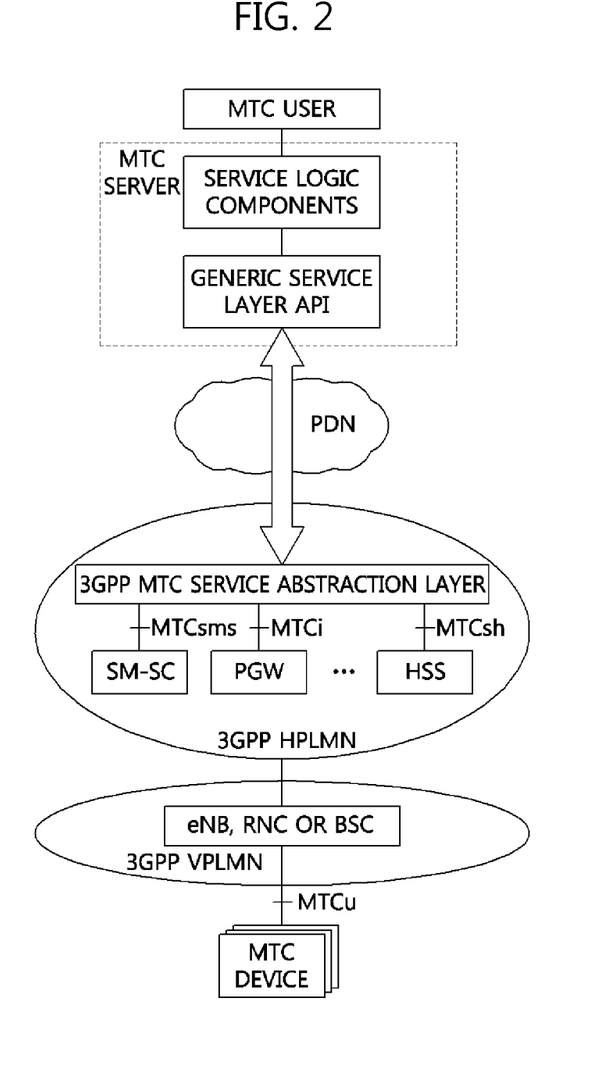
FIG. 2 is a diagram showing the constitution of a 3GPP network that provides a machine type communication (MTC) service.

FIG. 2 is a diagram showing the constitution of a 3GPP network that provides an MTC service.

Through a 3GPP system shown in FIG. 2, an end-to-end application between an MTC device and an MTC server is provided. The 3GPP system provides transmission and communication services (3GPP bearer service, IP multimedia service (IMS), and short message service (SMS)) optimized for MTC.

As shown in FIG. 2, an MTC device accesses a 3GPP network (universal terrestrial radio access network (UTRAN), evolved UTRAN (E-UTRAN), global system for mobile communications (GSM) edge RAN (GERAN), etc.) through an MTCu interface. The MTC device communicates with MTC service logic components using an MTC service abstraction layer that uses MTC functions, 3GPP bearer services, and SMS and IMS application servers provided by a public land mobile network (PLMN).

The MTC server is an entity that is connected with a 3GPP network through a generic service layer application programming interface (API). The MTC service abstraction layer has a unique capability of mapping to solid things provided by specific access. For example, a communication capability in 3GPP access is provided using MTCi/MTCsms interfaces, and the MTC service abstraction layer communicates with MTC devices according to the capability. The MTC service logic components may be outside or inside of an operator domain.

Among interfaces shown in FIG. 2, the MTCu interface provides access to a 3GPP network for transmission of user plane and control plane graphics. The MTCu interface may be based on Uu, Um, Ww and LTE-Uu interfaces.

Among the interfaces, the MTCi interface is a reference point that is used by the MTC server to connect to the 3GPP network and communicates with the MTC device through a 3GPP bearer service/IMS. The MTCi interface may be based on Gi, Sgi, and Wi interfaces.

Among the interfaces, the MTCsms interface is a reference point that is used by the MTC server to connect to the 3GPP network and communicates with the MTC device through a 3GPP SMS. The MTCsms interface provides transmission of user/subscriber-related data as well as service-related data.

In FIG. 2, an MTC user is provided with an MTC service through the MTC server. The MTC server may access the 3GPP network via a public data network (PDN) and perform a variety of MTC services. The 3GPP network may provide the MTC server with a communication network and perform a variety of control functions so that the MTC server can receive information on the MTC device that has accessed the 3GPP network. Also, the 3GPP network includes a home PLMN (HPLMN), which is a home network, and a visited PLMN (VPLMN), which is a visited network, and provides service.

As shown in FIG. 2, MTC devices are being standardized to be directly connected to a base station (or eNB).

An MTC device employs OFDM as a radio access technique in a maximum bandwidth of 20 MHz according to, for example, 3GPP specifications TS36.211 to TS36.213. In this case, an MTC device for a low-speed and low-mobility MTC service is generally implemented as a modem with low output and low power consumption, and it is difficult for an MTC device having such characteristics to connect to a communication network.

According to the current standard, a modem that operates at a maximum speed of 300 Mbps or more in a bandwidth of up to 20 MHz should be implemented, and also the output of a radio frequency (RF) part is relatively high and thus consumes high power.

Meanwhile, in order for a base station to conform to both 1.4 MHz and 5 MHz model standards which are suitable for low-speed data, a base station standard should be totally modified. Thus, it is difficult to standardize a narrowband modem standard of a base station to support a 20 MHz bandwidth for a short time period.

For this reason, the present invention proposes MTC gateway UE (MGUE) that can cause an MTC device having a low-output narrowband MTC modem to effectively interoperate with a base station without substantially modifying the current base station standard.

Figure 3:
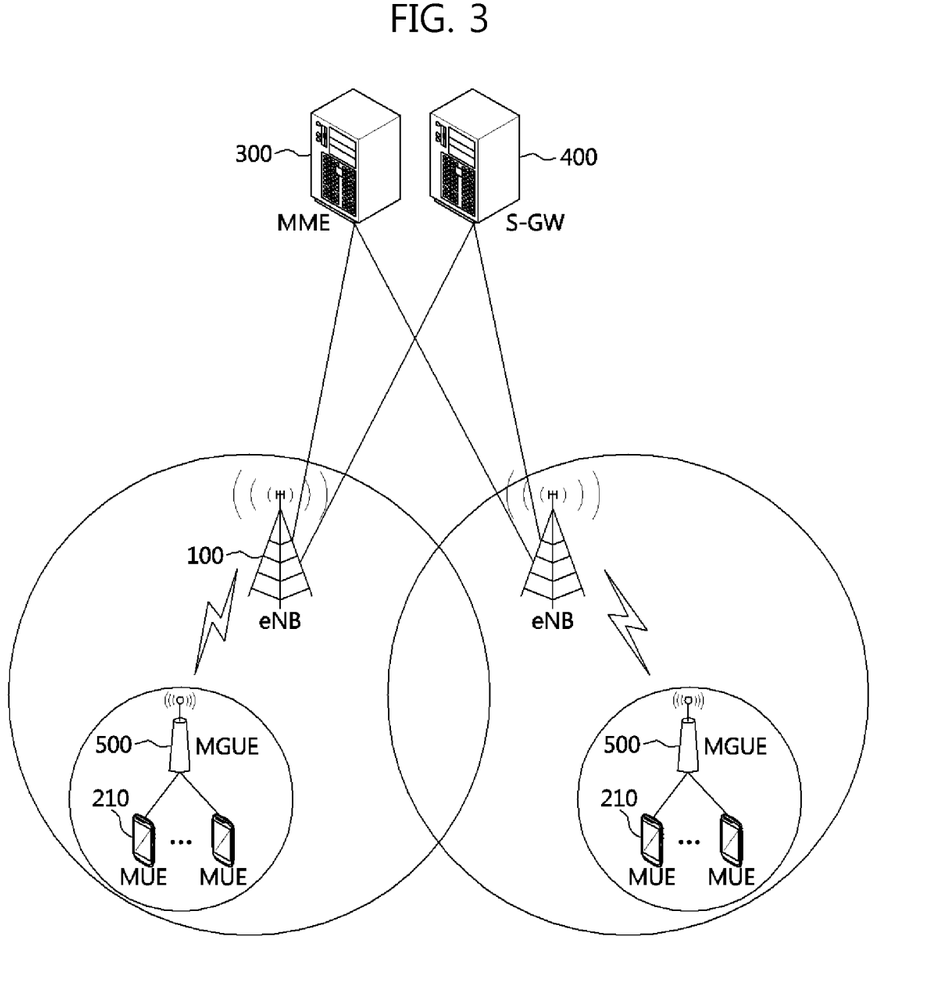
FIG. 3 is a conceptual diagram of a mobile communication system including MTC gateway user equipment (UE) (MGUE) according to an example embodiment of the present invention.

FIG. 3 is a conceptual diagram of a mobile communication system including MGUE according to an example embodiment of the present invention.

A communication system shown in FIG. 3 according to an example embodiment of the present invention may include an MME 300, a wired network including an S-GW 400, at least one base station (or eNB) 100 interoperating with the wired network, and at least one MTC device 210 communicating with the wired network through such a base station.

As shown in FIG. 3, the MGUE 500 is connected with the base station 100 using radio access technology that supports up to a maximum of 20 MHz according to, for example, 3GPP specifications TS36.211 to TS36.213. For effective access of at least one low-output narrowband MTC device, the MGUE 500 may also function as a base station having a relatively short cell radius.

The MGUE 500 according to example embodiments of the present invention may be permanently stationed at one fixed location, or may move into a cell radius of another base station as shown in FIG. 3.

In an application area in need of a continuous MTC service, the MGUE 500 may be permanently stationed (i.e., fixed without mobility). On the other hand, when occasional access is needed for reading electricity, gas, and water meters, etc., the MGUE 500 may be effectively accessed by MTC devices while moving.

In the present invention, using the above-described MGUE 500, the MTC device 210 can be implemented as UE having functions of a low-output low-speed narrowband modem. In other words, the MGUE 500 is used to perform relay between a base station and the MTC device 210, and thus there is no problem for the MTC device 210 to communicate with the base station even if the MTC device 210 is implemented as low-priced UE having functions of a low-output low-speed narrowband modem.

However, in connection with a narrowband LTE modem standard, LTE standardization may be performed to simplify 3GPP specifications TS36.211 to TS36.213, which are radio access technologies for existing OFDM having a maximum bandwidth of 20 MHz, for low speed in order to implement the current maximum transmission rate of 300 Mbps.

The MGUE 500 may switch its radio access standard between 20 MHz, 5 MHz and 1.4 MHz to match various MTC devices. A cell formed by the MGUE 500 according to an example embodiment of the present invention may be configured with a radius of about several hundred meters and low output.

Figure 4:
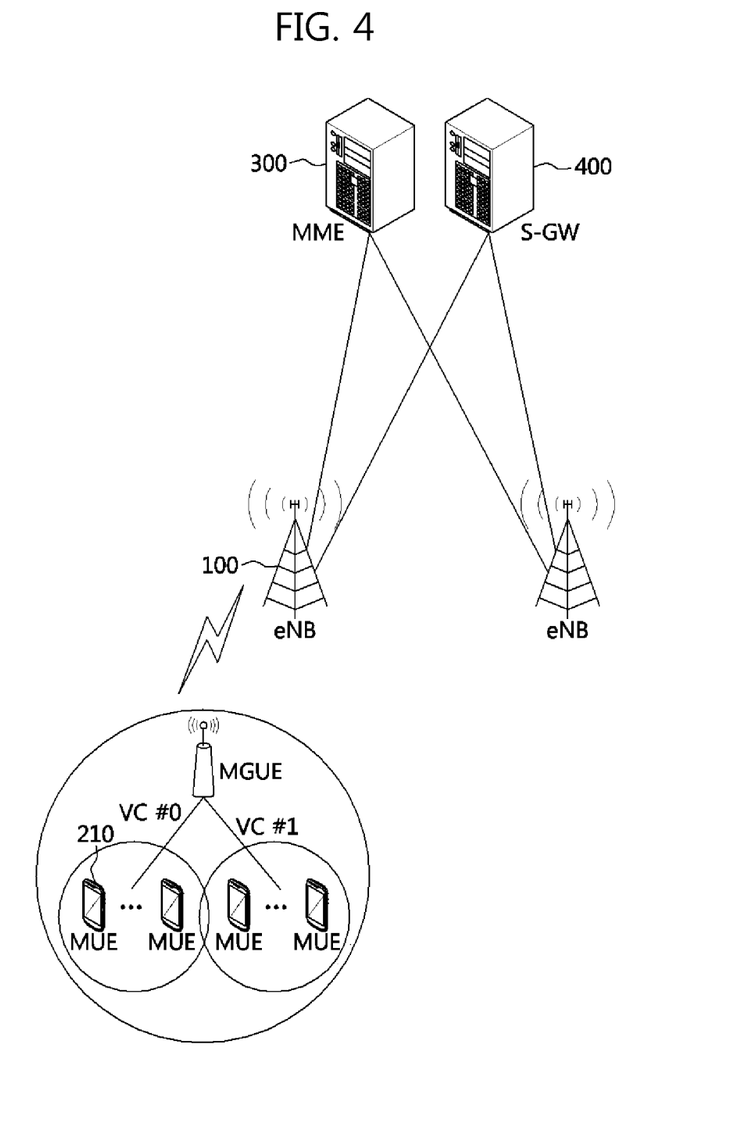
FIG. 4 is a conceptual diagram of a mobile communication system when MGUE has a plurality of virtual cells (VCs) according to an example embodiment of the present invention.

FIG. 4 is a conceptual diagram of a mobile communication system when MGUE has a plurality of virtual cells (VCs) according to an example embodiment of the present invention.

MGUE 500 according to an example embodiment of the present invention as shown in FIG. 4 may receive a control message from an MTC server via a mobile communication network and perform an MTC function. Also, the MGUE 500 may perform an MTC function under its own control, thereby transmitting collected data to a specific MTC server.

The MGUE 500 according to the example embodiment shown in FIG. 4 effectively accommodates a plurality of MTC devices that are classified into kinds of groups. Here, the MGUE 500 may be present in the form of a small base station that has a small cell radius and can move.

The present invention proposes the concept of a virtual cell (VC), in which one VC includes at least one MTC device. Also, the one piece of MGUE 500 may have a plurality of VCs, and the MGUE 500 may manage and control MTC devices according to groups of respective VC units by, for example, performing triggering of MTC devices in an MGUE cell using VCs.

FIG. 4 shows an example embodiment in which MTC devices operate only in a specific VC of even the same MGUE 500. In other words, even in the same VC radius, only MTC devices receiving a predetermined VC number may be activated and triggered.

Figure 5:
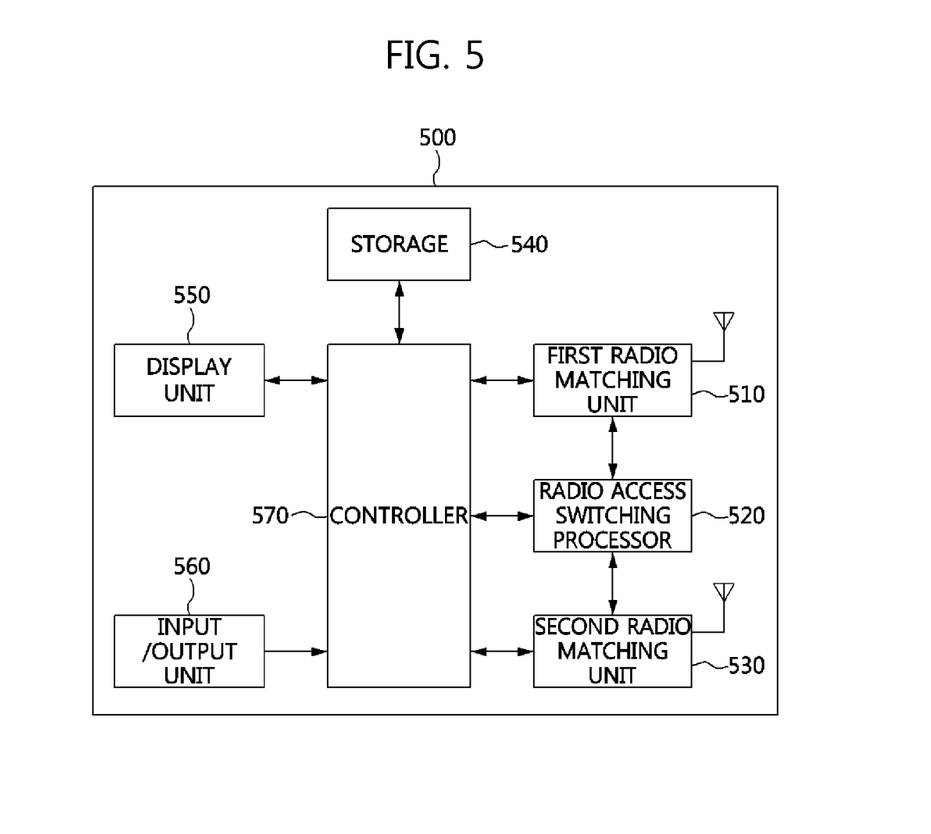
FIG. 5 is a block diagram of MGUE according to an example embodiment of the present invention.

FIG. 5 is a block diagram of MGUE according to an example embodiment of the present invention.

MGUE 500 according to example embodiments of the present invention may include a first radio matching unit 510 that provides radio access matching with a base station, a second radio matching unit 530 that provides radio access matching with at least one MTC device, a radio access switching processor 520 that converts data respectively output by the first radio matching unit 510 and the second radio matching unit 520 and provides the converted data, and a controller 570 that finds an identifier (ID) of at least one MTC device related to MTC control information received from the first radio matching unit 510 and controls the second radio matching unit 530 to transmit the MTC control information to the MTC device. In addition, the MGUE 500 may further include a storage 540, a display unit 550, and an input/output unit 560.

The MGUE 500 is connected with a base station using radio access technology that supports up to a maximum of 20 MHz according to 3GPP specifications, for example, TS36.211 to TS36.213. The first radio matching unit 510 performs access function matching with the base station, and receives an MTC message from an MTC server. Meanwhile, the MGUE 500 may not only receive an MTC message through an MTC server but also receive an MTC-related command from a user through the input/output unit 560.

Here, the user may be a manager in charge of metering, for example, in the case of smart metering, and the input/output unit 560 may be connected with UE of the manager by wire through a cable, or the like. More preferably, the input/output unit 560 may be wirelessly connected with the UE of the manager using near field communication (NFC), and so on. Thus, when a measuring instrument comes close to the MGUE 500 within a predetermined distance, the input/output unit 560 may be activated, and data transmission may be performed.

The MGUE 500 also performs radio access function matching with at least one MTC device through the second radio matching unit 530. For example, the MGUE 500 and a plurality of MTC devices, which have 20 MHz, 5 MHz and 1.4 MHz radio access functions respectively, can wirelessly access each other.

The radio access switching processor 530 performs a mutual conversion process between traffic of an MTC device conforming to a low-speed (1.4 MHz or 5 MHz) radio access standard and traffic of an MTC server operating in a 20 MHz band so that the MTC device and the MTC server can communicate with each other.

The controller 570 interprets the MTC control information (e.g., in the form of an SMS message) received from the first radio matching unit 510, and receives required IDs of MTC devices from the MTC server or acquires the IDs from the storage 540.

The controller 570 controls the second radio matching unit 530 to transmit a message for activating the MTC devices corresponding to the acquired MTC IDs. The second radio matching unit 530 receives related information from MTC devices, and the radio access switching processor 520 converts the information received from the MTC devices and provides the converted information to the controller 570 or the first radio matching unit 510.

The information received from the several MTC devices may be directly transmitted to the MTC server through the first radio matching unit 510 via a mobile communication network, or may be integrated, stored, and then transmitted to the MTC server through a base station at once.

The storage 540 stores a variety of data required for managing a plurality of MTC devices, such as IDs of the respective MTC devices that can be processed by the MGUE 500, an authentication key, activation/deactivation data, and transmission/reception triggering values of the respective MTC devices. Here, the IDs of the respective MTC devices may be managed as a group according to an application field.

The display unit 550 displays state information on the MGUE 500, and provides process results, etc. to a screen when an administrator or a user directly inputs a control command.

Although the first radio matching unit 510, the second radio matching unit 520, and the radio access switching processor 520 are shown as separate blocks in FIG. 5, these three blocks may be combined into one radio matching block in which functions of the three blocks are integrated.

Here, the MGUE 500 may be permanently stationed at a fixed location or may have mobility.

Figure 6:
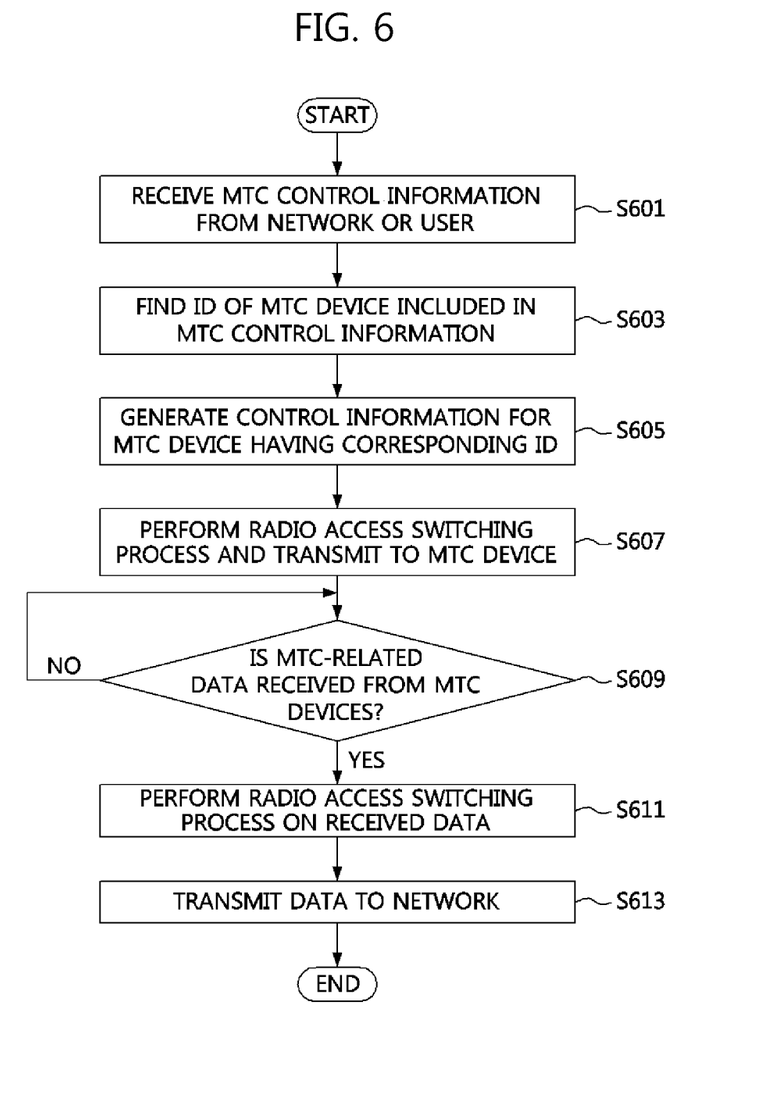
FIG. 6 is an operation flowchart illustrating a communication method of MGUE according to an example embodiment of the present invention.

FIG. 6 is an operation flowchart illustrating a communication method of MGUE according to an example embodiment of the present invention.

First, MGUE receives MTC control information from a base station or directly receives MTC control information from an administrator or a user through an input/output unit of the MGUE (S601). The MGUE finds an ID of an MTC device included in the MTC control information (S603), and generates control information for the MTC device having the ID (S605). For communication with an MTC device operating in a narrowband, the generated control information is subjected to a radio access matching process (S607) and transmitted to at least one MTC device. Here, the at least one MTC device may be devices belonging to the same group (referred to as a VC in this specification).

Subsequently, when the MGUE receives MTC data from the MTC devices that have received the MTC control information and have been activated (S609), the MGUE performs a radio access switching process on the received data (S611), and transmits the data to a network (S613).

Using the above-described MGUE according to example embodiments of the present invention, it is possible to implement a low-power low-output MTC device for providing an MTC service in a mobile communication system.

Also, by accommodating a plurality of low-speed low-output devices in an LTE network, a new market can be opened up.

While the example embodiments of the present invention and their advantages have been described in detail, it should be understood that various changes, substitutions and alterations may be made herein without departing from the scope of the invention.

What is claimed is:

1. Machine type communication (MTC) gateway user equipment (UE) (MGUE) accessed by at least one MTC device, the MGUE comprising:
   a first radio matching unit configured to process a signal having a first frequency band characteristic and provide radio access matching with a base station;
   a second radio matching unit configured to process a signal having a second frequency band characteristic and provide radio access matching with the at least one MTC device;
   a radio access switching processor configured to convert data respectively output by the first radio matching unit and the second radio matching unit, and provide the converted data; and
   a controller configured to find an identifier (ID) of at least one MTC device related to MTC control information received from the first radio matching unit, and control the second radio matching unit to transmit the MTC control information to the MTC device.

2. The MGUE of claim 1, wherein the controller controls MTC devices in units of at least one virtual cell (VC), and each VC includes at least one MTC device.

3. The MGUE of claim 1, further comprising a storage configured to store at least one piece of data among an ID of at least one MTC device, an authentication key, activation or deactivation-related data, and a transmission/reception triggering value of the MTC device.

4. The MGUE of claim 3, wherein the controller searches the ID of the at least one MTC device stored in the storage to find the ID of the at least one MTC device related to the MTC control information.

5. The MGUE of claim 1, further comprising an input/output unit configured to receive MTC control information directly input without passing through the base station, and provide the received MTC control information to the controller.

6. The MGUE of claim 1, wherein the radio access switching processor converts a signal output from the second radio matching unit into the signal having the first frequency band characteristic, and provides the converted signal to the first radio matching unit.

7. The MGUE of claim 1, wherein a bandwidth or a center frequency of the first frequency band differs from a bandwidth or a center frequency of the second frequency band.

8. The MGUE of claim 1, wherein the MGUE is permanently stationed at a fixed location.

9. The MGUE of claim 1, wherein the MGUE has mobility.

10. Machine type communication (MTC) gateway user equipment (UE) (MGUE) relaying communication between at least one MTC device and a base station, the MGUE comprising:
    a radio matching unit configured to provide radio access matching with the base station and radio access matching with the at least one MTC device; and
    a controller configured to find an identifier (ID) of at least one MTC device related to MTC control information received from the radio matching unit, and control the radio matching unit to transmit the MTC control information to the at least one MTC device found,
    wherein the radio matching unit receives the MTC control information through radio resources having a first frequency band characteristic.

11. A machine type communication (MTC) data relay method of MTC gateway user equipment (MGUE) relaying data transmission/reception between at least one MTC device and a base station, the method comprising:
    receiving MTC control information for controlling at least one MTC device from the base station;
    finding an identifier (ID) of the at least one MTC device related to the MTC control information; and
    performing a radio access matching process for data to be transmitted to the MTC device, and transmitting the data subjected to the radio access matching process to the at least one MTC device related to the MTC control information,
    wherein the receiving the MTC control information for controlling the at least one MTC device from the base station includes receiving the MTC control information through radio resources having a first frequency band characteristic.

12. The MTC data relay method of claim 11, wherein the at least one MTC device is classified into at least one virtual cell (VC).

13. The MTC data relay method of claim 11, further comprising receiving MTC control information directly input without passing through the base station.

14. The resource allocation apparatus of claim 11, wherein performing the radio access matching process for the data to be transmitted to the MTC device and transmitting the data subjected to the radio access matching process to the related at least one MTC device includes transmitting the data subjected to the radio access matching process to the at least one MTC device through radio resources having a second frequency band characteristic.

15. The resource allocation apparatus of claim 14, wherein a bandwidth or a center frequency of the second frequency characteristic differs from a bandwidth or a center frequency of the first frequency band characteristic.

16. The resource allocation apparatus of claim 11, wherein finding the ID of the at least one MTC device related to the MTC control information includes searching an ID of at least one MTC device stored in the MGUE to find the ID of the at least one MTC device related to the MTC control information.

17. The resource allocation apparatus of claim 11, further comprising:
    receiving data from the at least one MTC device;
    performing a radio access switching process so that the data received from the at least one MTC device has the first frequency band characteristic; and
    transmitting the data subjected to the radio access switching process to the base station.

* * * * *